United States Patent
Huang

(10) Patent No.: US 8,122,445 B2
(45) Date of Patent: Feb. 21, 2012

(54) PROCESSING SYSTEM CAPABLE OF DOWNLOADING FIRMWARE CODE AND BEING TESTED AT SAME SITE DURING MP PHASE

(75) Inventor: Shih-Hung Huang, Tao-Yuan (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 983 days.

(21) Appl. No.: 11/844,360

(22) Filed: Aug. 24, 2007

(65) Prior Publication Data

US 2009/0055820 A1    Feb. 26, 2009

(51) Int. Cl.
  *G06F 9/445*    (2006.01)
(52) U.S. Cl. .......................... 717/173; 717/178
(58) Field of Classification Search .............. None
  See application file for complete search history.

(56) References Cited

U.S. PATENT DOCUMENTS

| | | | |
|---|---|---|---|
| 6,170,043 B1 | 1/2001 | Hu | |
| 7,418,642 B2 * | 8/2008 | Taylor et al. | 714/733 |
| 7,974,673 B2 * | 7/2011 | Jacobsen et al. | 600/372 |
| 2005/0097541 A1 * | 5/2005 | Holland | 717/168 |
| 2005/0162182 A1 | 7/2005 | Ong | |
| 2007/0011522 A1 * | 1/2007 | Denniston | 714/724 |
| 2008/0147964 A1 * | 6/2008 | Chow et al. | 711/103 |

FOREIGN PATENT DOCUMENTS

TW    200703354    1/2007

* cited by examiner

*Primary Examiner* — Chuck Kendall
(74) *Attorney, Agent, or Firm* — Winston Hsu; Scott Margo

(57) ABSTRACT

A processing system capable of downloading a firmware code and being tested at the same site during a mass production phase includes: a processor for performing operations of the processing system, where the processor has a plurality of terminals as communication terminals of the processing system, and is capable of receiving the firmware code through the plurality of terminals of the processor; and a storage unit, coupled to the processor, for storing the firmware code received from the processor.

24 Claims, 3 Drawing Sheets

PROCESSING SYSTEM CAPABLE OF DOWNLOADING FIRMWARE CODE AND BEING TESTED AT SAME SITE DURING MP PHASE

BACKGROUND

The present invention relates to integrated circuits (ICs) design/manufacturing, and more particularly, to processing systems capable of downloading a firmware code and being tested at the same site during a mass production (MP) phase, and related methods.

Multi-chip package (MCP) technologies have become a popular solution for IC design houses to reduce the overall size of a system. For example, a core operation IC (e.g. a processor) and a Flash memory can be packaged together. Typically, the core operation IC cannot operate unless a firmware code to be executed by the core operation IC is downloaded into the Flash memory since the Flash memory initially has no meaningful information therein. According to the related art, the Flash memory comprises individual input/output terminals as a portion of terminals of the MCP module where the Flash memory is positioned (i.e. the input/output terminals mentioned above are exposed), so other devices outside the system may access the Flash memory directly or indirectly through the portion of terminals in order to download the firmware code into the Flash memory, where the portion of terminals (i.e. so-called flash pins/pads) still take up a lot of space. In addition, if the MCP module has been mounted on a printed circuit board (PCB) of the system, an additional port is still required for upgrading the firmware code in the Flash memory within the MCP module. Thus, the overall size of the system implemented by utilizing the conventional MCP technologies is not effectively reduced.

According to the related art, during a mass production phase, a first site is involved in order to download the firmware code into the Flash memory, and a second site is further involved for testing the operation of the core operation IC. Regarding jigs/tools required for the mass production phase mentioned above, it is cost-ineffective to integrate the two sites into the same site since a lot of additional probes of the jigs/tools should be provided and properly arranged. Thus, integrating the two sites into the same site is improper for MCP related products implemented according to the related art.

Please note that it is usually inappropriate for the IC design houses, corresponding IC manufacturers/manufacturing divisions, or corresponding IC packaging plants to provide MCP-packaged ICs with their customers' firmware code(s) well-downloaded therein since, in most of the cases, the ICs are customized. Thus, the customers should download specific firmware code(s) and test the ICs by themselves. In addition, at least the IC design houses, the corresponding IC manufacturers/manufacturing divisions, or the corresponding IC packaging plants should also download specific firmware code(s) and test the ICs, in order to control the quality of the ICs. As a result, the total number of sites involved in firmware download and IC testing are multiplied.

Regarding implementation of firmware download and IC testing according to the related art, as providing space, equipment/tools, and operators for the two sites mentioned above is required, it is hard to further reduce the overall cost.

SUMMARY

It is therefore an objective of the claimed invention to provide processing systems capable of downloading a firmware code and being tested at the same site during a mass production (MP) phase, and to provide related methods, in order to solve the above-mentioned problem.

It is another objective of the claimed invention to provide processing systems capable of downloading a firmware code and being tested at the same site during a mass production (MP) phase, and to provide related methods, in order to further reduce the overall pin count in contrast to the related art.

An exemplary embodiment of a processing system capable of downloading a firmware code and being tested at the same site during a mass production phase comprises: a processor for performing operations of the processing system, where the processor has a plurality of terminals as communication terminals of the processing system, and is capable of receiving the firmware code through the plurality of terminals of the processor; and a storage unit, coupled to the processor, for storing the firmware code received from the processor.

An exemplary embodiment of a method for downloading a firmware code into a processing system and testing the processing system at the same site during a mass production phase comprises: providing a processor and a storage unit within the processing system, where the processor is capable of being utilized for performing operations of the processing system, and the processor has a plurality of terminals as communication terminals of the processing system; utilizing the processor to receive the firmware code through the plurality of terminals of the processor; and utilizing the storage unit to store the firmware code received from the processor.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
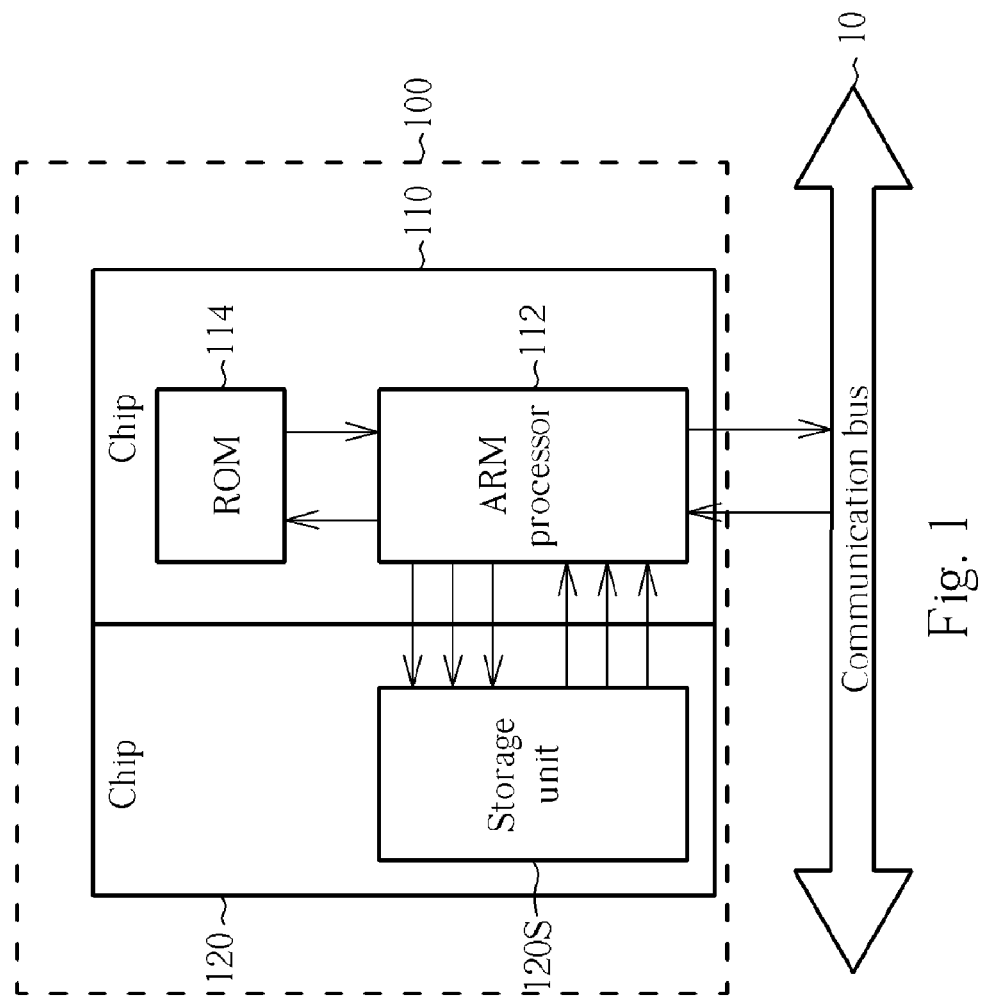
FIG. 1 is a diagram of a processing system capable of downloading a firmware code and being tested at the same site during a mass production phase according to one embodiment of the present invention.

Please refer to FIG. 1. FIG. 1 is a diagram of a processing system 100 capable of downloading a firmware code and being tested at the same site during a mass production (MP)

phase according to one embodiment of the present invention, where the processing system 100 of this embodiment is an embedded system, and the firmware code can be downloaded from a communication bus 10 coupled to a personal computer (PC) (not shown). As shown in FIG. 1, the processing system 100 comprises a first chip 110 and a second chip 120 packaged together by utilizing a multi-chip package (MCP).

According to this embodiment, the first chip 110 comprises a processor 112 and a read only memory (ROM) 114. According to various implementation choices of this embodiment, the processor 112 can be an Advanced RISC Machine (ARM) processor or the like, and therefore, is labeled as an "ARM processor" in FIG. 1. The ARM processor 112 is capable of being utilized for performing operations of the processing system 100. The ROM 114 stores at least one hardware code for the processor 112, so the ROM 114 may provide the ARM processor 112 with hardware command(s) within the hardware code.

As shown in FIG. 1, the ARM processor 112 has a plurality of terminals as communication terminals of the processing system 100. Thus, by utilizing the communication bus 10 which the communication terminals of the processing system 100 are coupled to, the ARM processor 112 is capable of communicating with an external device such as the PC mentioned above.

In addition, the second chip 120 of this embodiment comprises a storage unit 120S such as a non-volatile memory. More particularly, in this embodiment, the storage unit 120S can be a Flash memory. Please note that the storage unit 120S shown in FIG. 1 is coupled to the ARM processor 112, where none of the terminals of the storage unit 120S is utilized as a communication terminal of the processing system 100.

As the ARM processor 112 of this embodiment is capable of receiving the firmware code through the plurality of terminals of the ARM processor 112 (i.e. the communication terminals of the processing system 100), and as the ARM processor 112 is capable of further sending the received firmware code to the storage unit 120S, the storage unit 120S may store the firmware code received from the ARM processor 112. Thus, the processing system 100 may download the firmware code into the storage unit 120S via the ARM processor 112, and the ARM processor 112 is utilized as an interface of the storage unit 120S while downloading the firmware code into the storage unit 120S.

According to this embodiment, the hardware code mentioned above comprises at least one command for downloading the firmware code into the storage unit 120S via the ARM processor 112. As a result of this architecture disclosed above, the processing system 100 is capable of downloading the firmware code and being tested at the same site during the mass production phase, and the overall pin count is reduced in contrast to the related art.

According to a variation of this embodiment, the hardware code comprises a command for loading another command that is utilized for downloading the firmware code into the storage unit 120S via the ARM processor 112.

According to another variation of this embodiment, the ARM processor 112 is capable of writing its own setting parameters into the storage unit 120S.

According to another variation of this embodiment, the ARM processor 112 is capable of writing its own setting parameters into the storage unit 120S. Therefore, by utilizing a software/firmware command executed by the ARM processor 112, a signature can be written by the ARM processor 112. For example, the signature can be written into a non-volatile memory such as the storage unit 120S. If the ARM processor 112 finds the signature after rebooting, the ARM processor 112 may control the processing system 100 to enter a firmware download mode.

Figure 2:
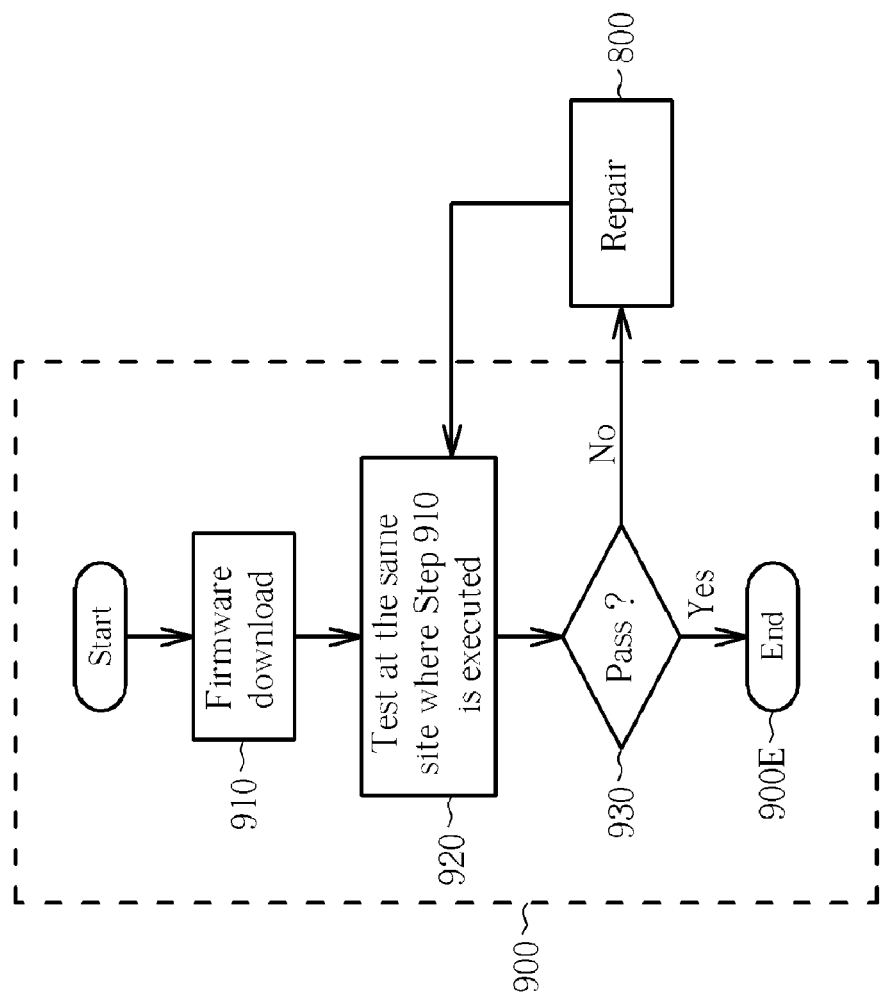
FIG. 2 is a flowchart of a method for downloading a firmware code into a processing system and testing the processing system at the same site during a mass production phase according to one embodiment of the present invention.

FIG. 2 illustrates a flowchart of a method 900 for downloading a firmware code into a processing system and testing the processing system at the same site during a mass production phase according to one embodiment of the present invention, where the method 900 can be implemented by utilizing the processing system 100 shown in FIG. 1, and can be described as follows.

In Step 910, firmware is downloaded by utilizing the ARM processor 112 to receive the firmware code through the plurality of terminals of the ARM processor 112 and by utilizing the storage unit 120S to store the firmware code received from the ARM processor 112.

In Step 920, the processing system 100 is tested at the same site where Step 910 is executed. Please note that, from Step 910 to Step 920, it is unnecessary to disconnect the processing system 100 from the communication bus 10.

In Step 930, it is checked whether a testing result derived from Step 920 indicates that the processing system 100 passes the test. If the processing system 100 passes the test, Step 900E is entered; otherwise, a repair procedure 800 is entered in order to repair the processing system 100 utilizing the operator. Once the processing system 100 is repaired in the repair procedure 800, Step 920 may be re-entered.

Figure 3:
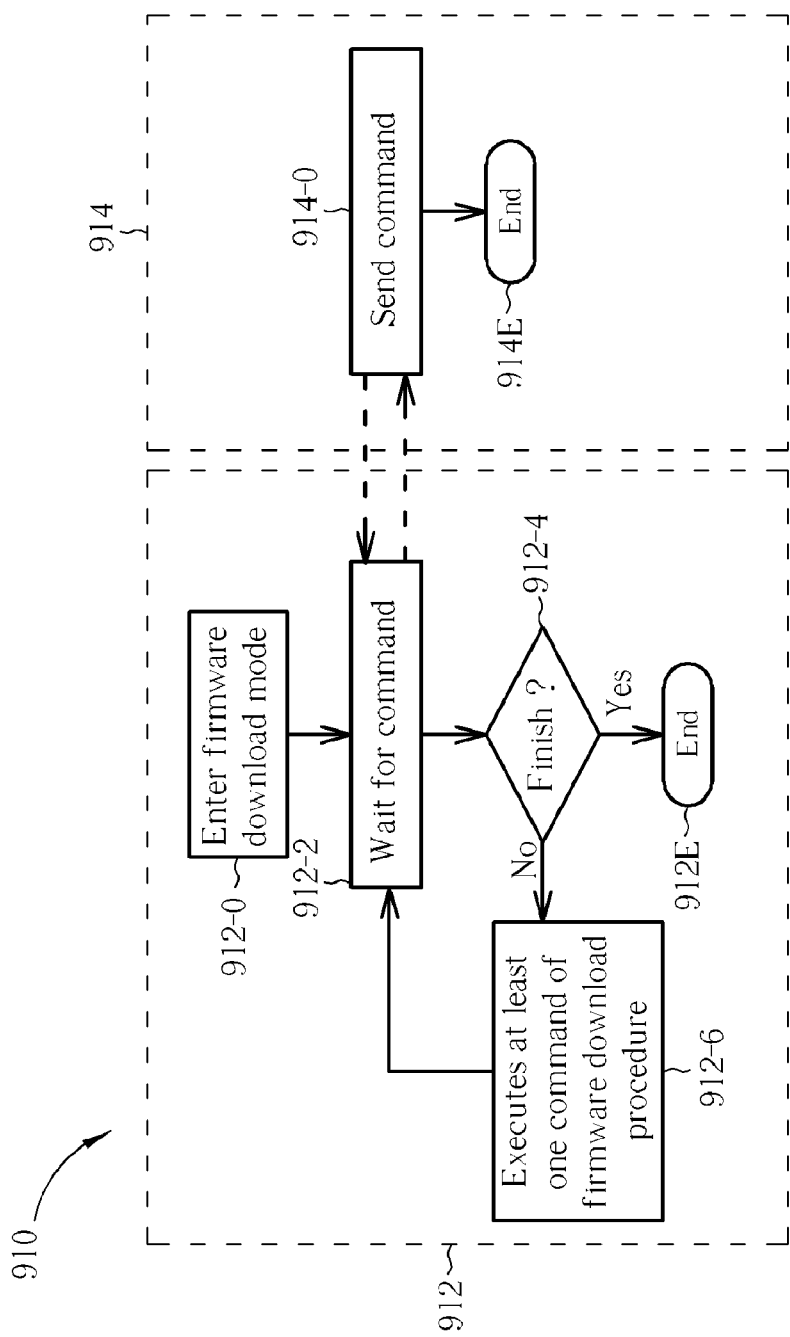
FIG. 3 illustrates a flowchart of implementation details of the method shown in FIG. 2 according to one embodiment of the present invention.

FIG. 3 illustrates a flowchart of implementation details of the download step shown in FIG. 2 (i.e. Step 910) according to one embodiment of the present invention, where the left portion 912 corresponds to operations of the processing system 100, and the right portion 914 corresponds to operations of the PC mentioned above. These implementation details can be further described as follows.

In Step 912-0, the processing system 100 (more particularly, in this embodiment, the ARM processor 112) enters a firmware download mode.

In Step 912-2, the ARM processor 112 waits for command(s) from the communication bus 10, which is coupled to the PC in this embodiment.

In Step 912-4, the ARM processor 112 checks whether the firmware download procedure is finished. If the firmware download procedure is finished, Step 912E is entered; otherwise, Step 912-6 is entered.

In Step 912-6, the ARM processor 112 executes at least one command of the firmware download procedure (e.g. program, erase, or read). After executing Step 912-6, Step 912-2 is re-entered.

In Step 914-0, the PC sends command(s) when needed. After the firmware download procedure is finished, Step 914E is entered.

In contrast to the related art, the processing systems and related methods of the present invention may perform firmware download and IC testing at the same site during the mass production phase. Therefore, the overall cost of space, equipment/tools, and operators can be further reduced.

It is an advantage of the claimed invention that, by utilizing the processing systems and related methods of the present invention, the overall pin count can be reduced in contrast to the related art. Those skilled in the art will readily observe that numerous modifications and alterations of the device and method may be made while retaining the teachings of the invention.

What is claimed is:

1. A processing system capable of downloading a firmware code and being tested at the same site during a mass production phase, comprising:
   a processor for performing operations of the processing system, wherein the processor has a plurality of terminals as communication terminals of the processing system, and is capable of receiving the firmware code through the plurality of terminals of the processor; and
   a storage unit, coupled to the processor, for storing the firmware code received from the processor.

2. The processing system of claim 1, wherein the processing system is an embedded system.

3. The processing system of claim 2, wherein the processor is an Advanced RISC Machine (ARM) processor or the like.

4. The processing system of claim 1, wherein the storage unit is a non-volatile memory.

5. The processing system of claim 1, wherein the storage unit is a Flash memory.

6. The processing system of claim 1, further comprising:
   a read only memory (ROM) for storing a hardware code for the processor.

7. The processing system of claim 6, wherein the hardware code comprises at least one command for downloading the firmware code into the storage unit via the processor.

8. The processing system of claim 6, wherein the hardware code comprises a command for loading another command that is utilized for downloading the firmware code into the storage unit via the processor.

9. The processing system of claim 1, wherein the processor is utilized as an interface of the storage unit while downloading the firmware code into the storage unit.

10. The processing system of claim 1, wherein the processor and the storage unit are packaged together by utilizing a multi-chip package (MCP).

11. A method for downloading a firmware code into a processing system and testing the processing system at the same site during a mass production phase, comprising:
   providing a processor and a storage unit within the processing system, wherein the processor is capable of being utilized for performing operations of the processing system, and the processor has a plurality of terminals as communication terminals of the processing system;
   utilizing the processor to receive the firmware code through the plurality of terminals of the processor; and
   utilizing the storage unit to store the firmware code received from the processor.

12. The method of claim 11, wherein the processing system is an embedded system.

13. The method of claim 12, wherein the processor is an Advanced RISC Machine (ARM) processor or the like.

14. The method of claim 11, wherein the storage unit is a non-volatile memory.

15. The method of claim 11, wherein the storage unit is a Flash memory.

16. The method of claim 11, further comprising:
   providing a read only memory (ROM); and
   utilizing the ROM to store a hardware code for the processor.

17. The method of claim 16, wherein the hardware code comprises at least one command for downloading the firmware code into the storage unit via the processor.

18. The method of claim 16, wherein the hardware code comprises a command for loading another command that is utilized for downloading the firmware code into the storage unit via the processor.

19. The method of claim 11, wherein the processor is utilized as an interface of the storage unit while downloading the firmware code into the storage unit.

20. The method of claim 11, further comprising:
   packaging the processor and the storage unit together by utilizing a multi-chip package (MCP).

21. The processing system of claim 1, wherein the processor is capable of writing its own setting parameters into the storage unit; and by utilizing a software/firmware command executed by the processor, the processor writes a signature into the storage unit.

22. The processing system of claim 21, wherein when the processor finds the signature after rebooting, the processor controls the processing system to enter a firmware download mode.

23. The method of claim 11, wherein the processor is capable of writing its own setting parameters into the storage unit; and the method further comprises:
   by utilizing a software/firmware command executed by the processor, writing a signature into the storage unit.

24. The method of claim 23, further comprising:
   when the processor finds the signature after rebooting, utilizing the processor to control the processing system to enter a firmware download mode.

* * * * *